(12) United States Patent
Ye et al.

(10) Patent No.: US 12,119,740 B2
(45) Date of Patent: Oct. 15, 2024

(54) DC/DC CONVERTER AND COMMUNICATION POWER SUPPLY WITH COMMON MODE NOISE SUPPRESSION

(71) Applicant: HUAWEI TECHNOLOGIES CO., LTD., GuangDong (CN)

(72) Inventors: Qiong Ye, Dongguan (CN); Jiebin Cheng, Dongguan (CN); Qinghai Wang, Shenzhen (CN); Fulong Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 17/879,579

(22) Filed: Aug. 2, 2022

(65) Prior Publication Data

US 2022/0376607 A1 Nov. 24, 2022

Related U.S. Application Data

(63) Continuation of application No. PCT/CN2021/103422, filed on Jun. 30, 2021.

(30) Foreign Application Priority Data

Sep. 7, 2020 (CN) .......................... 202010930447.4

(51) Int. Cl.
| | |
|---|---|
| H02M 1/12 | (2006.01) |
| H02M 1/00 | (2007.01) |
| H02M 1/44 | (2007.01) |
| H02M 3/00 | (2006.01) |
| H02M 3/335 | (2006.01) |

(52) U.S. Cl.
CPC ......... H02M 1/123 (2021.05); H02M 1/0064 (2021.05); H02M 1/12 (2013.01);
(Continued)

(58) Field of Classification Search
CPC ...... H02M 1/0064; H02M 1/12; H02M 1/123; H02M 1/32; H02M 1/44; H02M 3/01;
(Continued)

(56) References Cited

U.S. PATENT DOCUMENTS

| | | | |
|---|---|---|---|
| 2012/0063173 A1 | 3/2012 | Fu et al. | |
| 2015/0009727 A1* | 1/2015 | Zhou | H02M 1/44 |
| | | | 363/40 |

(Continued)

FOREIGN PATENT DOCUMENTS

| | | |
|---|---|---|
| CN | 103190063 A | 7/2013 |
| CN | 109643956 A | 4/2019 |

(Continued)

*Primary Examiner* — Thienvu V Tran
*Assistant Examiner* — Shahzeb K Ahmad
(74) *Attorney, Agent, or Firm* — Rimon PC (57) ABSTRACT

The converter includes a primary-side winding, a secondary-side winding, a resonant inductor, a resonant capacitor, and a noise suppression network. The primary-side winding and the secondary-side winding form a transformer. The noise suppression network is connected between a primary-side quiescent point and a secondary-side quiescent point. The primary-side quiescent point is a direct current stable potential at an input terminal of the DC/DC converter. The secondary-side quiescent point is a direct current stable potential at an output terminal of the DC/DC converter. A first parasitic capacitance between a first terminal of the primary-side winding and the secondary-side quiescent point is equal to a second parasitic capacitance between a second terminal of the primary-side winding and the secondary-side quiescent point. A suppression current is generated by the noise suppression network, and has a direction opposite to a direction of a total noise current generated by the resonant inductor.

19 Claims, 6 Drawing Sheets

(52) U.S. Cl.
CPC ............... *H02M 1/44* (2013.01); *H02M 3/01* (2021.05); *H02M 3/015* (2021.05); *H02M 3/33571* (2021.05); *H02M 3/33573* (2021.05); *H02M 3/335* (2013.01)

(58) Field of Classification Search
CPC ........ H02M 3/015; H02M 3/28; H02M 3/335; H02M 3/33507; H02M 3/33571; H02M 3/33573; H02M 3/33576; H02M 1/42; H02M 1/4208; H02M 1/4241; H02M 7/4815; H02M 7/4818; H02M 7/4826; H02M 7/523
See application file for complete search history.

(56) References Cited

U.S. PATENT DOCUMENTS

| | | | | |
|---|---|---|---|---|
| 2017/0012548 | A1* | 1/2017 | Sakuno | H02M 3/33592 |
| 2018/0074538 | A1* | 3/2018 | Zhang | H01F 27/42 |
| 2019/0097530 | A1* | 3/2019 | Andres | H02M 1/44 |
| 2019/0319532 | A1* | 10/2019 | Wang | H02M 3/33573 |
| 2020/0076315 | A1* | 3/2020 | Peng | H02M 3/33576 |
| 2020/0211762 | A1* | 7/2020 | Jitaru | H02M 3/155 |
| 2020/0235656 | A1* | 7/2020 | Forouzesh | H02M 1/4258 |
| 2022/0278622 | A1* | 9/2022 | Nishimoto | H02M 3/33573 |

FOREIGN PATENT DOCUMENTS

| | | | | |
|---|---|---|---|---|
| CN | 110289752 | A | 9/2019 | |
| CN | 110875688 | A | 3/2020 | |
| CN | 112234824 | A | 1/2021 | |
| EP | 3499676 | A1 | 6/2019 | |
| JP | 2001352755 | A | 12/2001 | |
| WO | WO-2012028787 | A2 * | 3/2012 | ............. H02M 1/44 |

* cited by examiner

DC/DC CONVERTER AND COMMUNICATION POWER SUPPLY WITH COMMON MODE NOISE SUPPRESSION

CROSS-REFERENCE TO RELATED APPLICATIONS

This application is a continuation of International Application No. PCT/CN2021/103422, filed on Jun. 30, 2021, which claims priority to Chinese Patent Application No. 202010930447.4, filed on Sep. 7, 2020. The disclosures of the aforementioned applications are hereby incorporated by reference in their entireties.

TECHNICAL FIELD

This application relates to the field of power electronics technologies, and in particular, to a DC/DC converter and a communication power supply.

BACKGROUND

Currently, a switch-mode power supply converter is widely used in a communication power supply due to advantages such as high efficiency and small size. A continuously increasing power load capacity brings an increasingly high requirement on a power density of a power module. However, a volume of a magnetic component may define a relatively large proportion in an existing switch-mode power supply converter.

To reduce the volume occupied by the magnetic component, a working frequency of the magnetic component may be improved. For example, a working frequency of a switch mode power supply is increased from 200 kHz to 1 MHz-10 MHz. However, increasing of a switching frequency increases a switching noise (a bare noise increases by at least 20 dB). This brings a large amount of pressure to a previous-stage filter circuit. Therefore, how to reduce noises of the switch mode power supply and the costs of the previous-stage filter circuit has become an important research topic.

Figure 1:
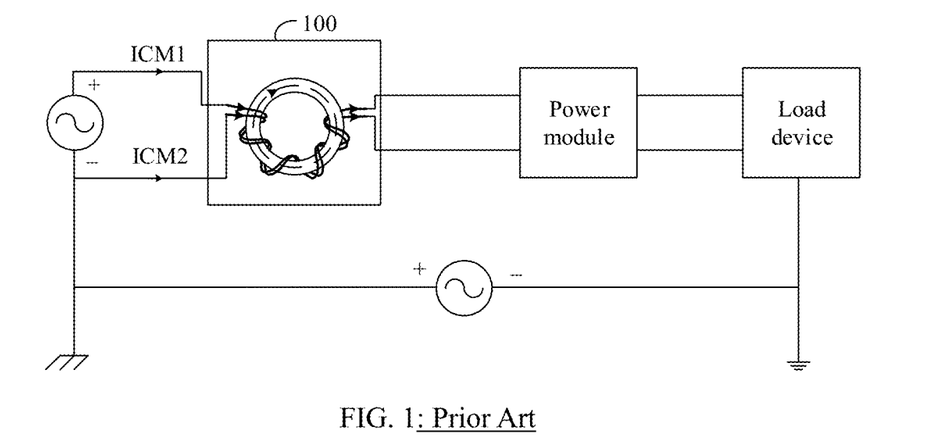
FIG. 1 is a schematic diagram of suppressing a common mode interference in a conventional technology.

Currently, a main problem faced by the switch mode power supply is common mode interference. A common mode inductor may be used for filtering. FIG. 1 is a schematic diagram of suppressing common mode interference in conventional technology.

In FIG. 1, a common mode inductor 100 suppresses a common mode current output by an alternating current power supply.

The common mode inductor 100 has a high resistance characteristic for the common mode current, and may attenuate a common mode noise. Therefore, a relatively good common mode filtering effect can be achieved.

However, as power of the switch mode power supply increases, a current on an input side of the switch mode power supply increases. This requires that the common mode inductor has a large enough through-current capacity. In addition, a magnetic core of the common mode inductor needs to be increased to prevent saturation of the magnetic core, and a volume of the magnetic core increases accordingly. Consequently, a volume of the common mode inductor may be extremely large. This is not conducive to miniaturization of a filter circuit, and limits miniaturization of the switch mode power supply.

SUMMARY

To resolve the foregoing technical problems, this application provides a Direct Current/Direct Current (DC/DC) converter and a communication power supply, to suppress a common mode noise and facilitate miniaturization of a switch mode power supply.

An embodiment of this application provides a DC/DC converter. The DC/DC converter is an LLC resonant DC/DC converter. The LLC resonant DC/DC converter may be a full-bridge LLC resonant DC/DC converter, or may be a half-bridge LLC resonant DC/DC converter. A working principle is as follows: An input direct current is converted into an alternating current. After passing through a transformer, the alternating current is transmitted to a rectifier circuit at an output terminal. The rectifier circuit rectifies the alternating current into a direct current, and then outputs the direct current. Due to isolation of the transformer, an interference signal can be isolated. Therefore, an interference signal of a primary-side winding of the transformer cannot be transmitted to a secondary-side winding of the transformer.

The DC/DC converter includes a primary-side winding, a secondary-side winding, a resonant inductor, a resonant capacitor, and a noise suppression network. The primary-side winding, the resonant inductor, and the resonant capacitor are connected between a first node and a second node after being connected in series. The secondary-side winding is connected between a third node and a fourth node. The primary-side winding and the secondary-side winding form a transformer. The noise suppression network is connected between a primary-side quiescent point and a secondary-side quiescent point of the transformer. The primary-side quiescent point is a direct current stable potential at an input terminal of the DC/DC converter. The secondary-side quiescent point is a direct current stable potential at an output terminal of the DC/DC converter. A first parasitic capacitance between a first terminal of the primary-side winding and the secondary-side quiescent point is equal to a second parasitic capacitance between a second terminal of the primary-side winding and the secondary-side quiescent point. The noise suppression network is configured to generate a suppression current. A direction of the suppression current is opposite to a direction of a total noise current generated by the resonant inductor and the resonant capacitor. The suppression current is used to suppress the total noise current. A voltage of the noise suppression network varies with a size of a load.

In actual design, it is difficult to achieve complete symmetry. In other words, the first parasitic capacitance $C_{AD}$ is not equal to the second parasitic capacitance $C_{BD}$. Therefore, a channel of a common mode noise appears between the primary-side winding and the secondary-side winding of the transformer. However, $C_{AD}=C_{BD}$ may be implemented by adding a balance capacitance. When the transformer is symmetrical, if a source signal of the common mode noise is balanced, the common mode noise can be cancelled. In addition, a common mode noise generated by a leakage inductor of a transformer may also be canceled on the symmetrical transformer. The balance capacitance may be added between a node A and a node D, or between a node B and a node D. Specifically, a value relationship between $C_{AD}$ and $C_{BD}$ may be analyzed. After the balance capacitance is added. $C_{AD}=C_{BD}$ may be implemented. A quiescent point is relative to a GND, and has a stable direct current potential. The quiescent point exists on a primary side of the transformer, and also exists on a secondary side of the transformer. As the name implies, a potential of a moving point fluctuates relative to that of the quiescent point.

In this technical solution, in addition to the balance capacitance, the DC/DC converter further includes the noise suppression network. The noise suppression network may generate the suppression current. The direction of the suppression current is opposite to the direction of the total noise current generated by the resonant inductor and the resonant capacitor. Therefore, the total noise current generated by the resonant inductor and the resonant capacitor can be suppressed. A current source of the noise suppression network may be additionally added, or may come from energy inside the DC/DC converter. The noise suppression network is connected between the primary-side quiescent point and the secondary-side quiescent point of the transformer. Therefore, a common mode noise caused by a resonant circuit on a parasitic capacitor between the primary-side winding and the secondary-side winding of the transformer can be effectively reduced. In addition, the voltage of the noise suppression network varies with the size of the load. Therefore, the noise suppression network can be applied to suppress a common mode noise in a full load range. When a load changes, a current changes. Voltage amplitudes of inductors (the resonant inductor Lr and the leakage inductor Lk) are proportional to the current. Therefore, voltage amplitudes of Lk, Lr, and the resonant capacitor Cr all vary with the load. The voltage of the noise suppression network provided in this embodiment varies with the size of the load. Therefore, suppression of the common mode noise in the full load range can be implemented. Regardless of the size of the load, the noise suppression network can automatically adjust output of the noise suppression network based on the size of the load. Therefore, the common mode noise in the full load range can be cancelled.

Preferably: the noise suppression network includes a signal source and an impedance network. The impedance network is configured to adjust a voltage amplitude of the signal source between the primary-side quiescent point and the secondary-side quiescent point. The signal source and the impedance network are connected between the primary-side quiescent point and the secondary-side quiescent point after being connected in series.

The signal source may be implemented in a plurality of manners. An additional signal source may be added. Alternatively, energy from the converter, for example, from a resonant inductor or a resonant capacitor may be directly coupled to form the signal source.

For example, the signal source couples energy from the resonant inductor. A voltage amplitude of the signal source is directly proportional to a voltage amplitude of the resonant inductor. In other words, when the voltage on the resonant inductor increases, the voltage of the signal source also increases.

Coupling energy from the resonant inductor may be implemented as follows: An inductor couples energy from the resonant inductor by using a magnetic field. That is, the signal source includes a cancellation inductor. The cancellation inductor is configured to couple energy from the resonant inductor. The cancellation inductor is connected between the primary-side quiescent point and the secondary-side quiescent point after being connected in series to the impedance network.

In embodiments to facilitate winding and save a magnetic core, the cancellation inductor and the resonant inductor are wound on a same magnetic core.

In addition to the cancellation inductor, a capacitor may be used to couple energy from the resonant inductor. That is, the signal source includes a first capacitive coupling circuit. The first capacitive coupling circuit is configured to couple energy from the resonant inductor. The first capacitive coupling circuit is connected between the primary-side quiescent point and the secondary-side quiescent point after being connected in series to the impedance network.

The signal source couples energy from the resonant capacitor. A voltage amplitude of the signal source is directly proportional to a voltage amplitude of the resonant capacitor. In other words, when the voltage on the resonant capacitor increases, the voltage of the signal source also increases.

The foregoing describes that the signal source couples energy from the resonant inductor. The following describes that the signal source couples energy from the resonant capacitor. Coupling energy from the resonant capacitor may be implemented in a plurality of manners. For example, a capacitive coupling circuit may couple energy from the resonant capacitor, or a coupling transformer may couple energy from the resonant capacitor, which are separately described below:

That is, the signal source includes a second capacitive coupling circuit. The second capacitive coupling capacitor is configured to couple energy from the resonant capacitor. The second capacitive coupling circuit is connected between the primary-side quiescent point and the secondary-side quiescent point after being connected in series to the impedance network.

That is, the signal source includes a signal coupling transformer. A primary-side winding of the signal coupling transformer is configured to couple energy from the resonant capacitor. A secondary-side winding of the signal coupling transformer is connected between the primary-side quiescent point and the secondary-side quiescent point after being connected in series to the impedance network.

To implement a better noise reduction effect, a sum of a total noise current generated on a parasitic capacitor by the resonant inductor and the resonant capacitor and a current of a cancellation impeder is zero. The parasitic capacitor is a parasitic capacitor between the primary-side winding and the secondary-side winding.

That is, an expression is as follows:

$$V_C/Z1+V_L/Z2+V/Z=0, \text{ where}$$

$V_C$ indicates voltages at both terminals of the resonant capacitor. $V_L$ indicates inductances at both terminals of the resonant inductor. Z1 indicates an impedance presented by $C_{AD}$, and Z2 indicates an impedance presented by $C_{BD}$.

Preferably, the DC/DC converter includes at least one of a full-bridge LLC resonant DC/DC converter and a half-bridge LLC resonant DC/DC converter.

Preferably, the converter further includes a full-wave rectifier circuit. The secondary-side winding includes a first secondary-side winding and a second secondary-side winding. The first secondary-side winding is connected between the third node and a fifth node. The second secondary-side winding is connected between the fifth node and the fourth node. The third node and the fourth node are connected to the full-wave rectifier circuit. An output terminal of the full-wave rectifier circuit is the output terminal of the DC/DC converter.

The signal source couples energy from the resonant inductor, and no additional signal source needs to be added. This is easy to implement. A cancellation inductor is wound on the magnetic core of the resonant inductor, and the energy is coupled from only the resonant inductor. An amplitude of a received signal may be adjusted by using the impedance network Z connected in series to the cancellation inductor. Currents passing through Cr and Lr both vary with a load, so that an amplitude of a voltage coupled to the cancellation inductor varies with the currents. Therefore, this solution is applicable to noise suppression in a full load range.

Preferably, the converter further includes a full-bridge rectifier circuit. There is one secondary-side winding. The third node and the fourth node are respectively a positive electrode and a negative electrode of an input terminal of the full-bridge rectifier circuit. An output terminal of the full-bridge rectifier circuit is the output terminal of the DC/DC converter.

In addition, the impedance network includes at least one of a resistor, a capacitor, and an inductor, in other words, includes at least one or more of the above three. For example, the impedance network includes one, two, or three of the above.

An embodiment of this application further provides a communication power supply, including the DC/DC converter described above, and further including a rectifier circuit. A first terminal of the rectifier circuit is configured to connect to an alternating current power supply. The rectifier circuit is configured to convert an alternating current of the alternating current power supply into a direct current. A second terminal of the rectifier circuit is configured to connect to a first terminal of the DC/DC converter. A second terminal of the DC/DC converter is configured to supply power to a load. The DC/DC converter is configured to: after converting the direct current, provide an obtained current to the load.

The load may be any power-consuming device. In other words, the DC/DC converter 200 may output different voltages based on different loads, for example, may output voltages such as 48 V, 12 V, 5 V, and 3.3 V.

For the communication power supply provided in this embodiment of this application, a noise suppression network is added in the DC/DC converter of the communication power supply. The noise suppression network may generate a suppression current. A direction of the suppression current is opposite to a direction of a current of a resonant inductor and a resonant capacitor. Therefore, a total noise current generated by the resonant inductor and the resonant capacitor can be suppressed. A current source of the noise suppression network may be additionally added, or may come from energy inside the DC/DC converter. The noise suppression network is connected between a primary-side quiescent point and a secondary-side quiescent point of a transformer. Therefore, a common mode noise caused by a resonant circuit on a parasitic capacitor between a primary-side winding and a secondary-side winding of the transformer can be effectively reduced. In addition, a voltage of the noise suppression network varies with a size of a load. Therefore, the noise suppression network can be applied to suppress a common mode noise in a full load range. Therefore, the communication power supply including the DC/DC converter can achieve a better suppression effect on the common mode noise, thereby providing a higher quality power supply for the load.

Compared with a conventional technology, the technical solutions provided in the embodiments of this application have the following advantages.

The DC/DC converter provided in the technical solution is an LLC resonant DC/DC converter, including the transformer and the resonant circuit. The resonant circuit is connected in series to the primary-side winding of the transformer. The resonant circuit includes the resonant inductor and the resonant capacitor that are connected in series. There is a leakage inductor of the transformer. A current flowing through the leakage inductor varies with a size of load. Therefore, different currents have different impact on the leakage inductor. A greater inductance flowing through the leakage inductor brings greater impact on the leakage inductor as a noise source. Therefore, the leakage inductor is non-negligible. Therefore, to reduce impact of the common mode noise within a full load range, the noise suppression network is added to the DC/DC converter when a first parasitic capacitance between a first terminal of the primary-side winding of the transformer and the secondary-side quiescent point is equal to a second parasitic capacitance between a second terminal of the primary-side winding and the secondary-side quiescent point. The noise suppression network may generate the suppression current. The direction of the suppression current is opposite to the direction of the total noise current generated by the resonant inductor and the resonant capacitor. Therefore, the total noise current generated by the resonant inductor and the resonant capacitor can be suppressed. The current source of the noise suppression network may be additionally added, or may come from energy inside the DC/DC converter. The noise suppression network is connected between the primary-side quiescent point and the secondary-side quiescent point of the transformer. Therefore, the common mode noise caused by the resonant circuit on the parasitic capacitor between the primary-side winding and the secondary-side winding of the transformer can be effectively reduced. In addition, the voltage of the noise suppression network varies with the size of the load. Therefore, the noise suppression network can be applied to suppress a common mode noise in a full load range.

DESCRIPTION OF EMBODIMENTS

To enable a person skilled in the art to better understand technical solutions provided in the embodiments of this application, the following first describes a working principle of a DC/DC converter.

The DC/DC converter provided in the embodiments of this application is an isolated switch mode power supply. An LLC resonant DC/DC converter is used as an example for description. Based on a topology of a circuit connected to a primary side of a transformer, the LLC resonant DC/DC converter may be a full-bridge LLC resonant DC/DC converter, or may be a half-bridge LLC resonant DC/DC converter. A form of a rectifier circuit connected to a secondary-side winding of the transformer is not limited.

Figure 2:
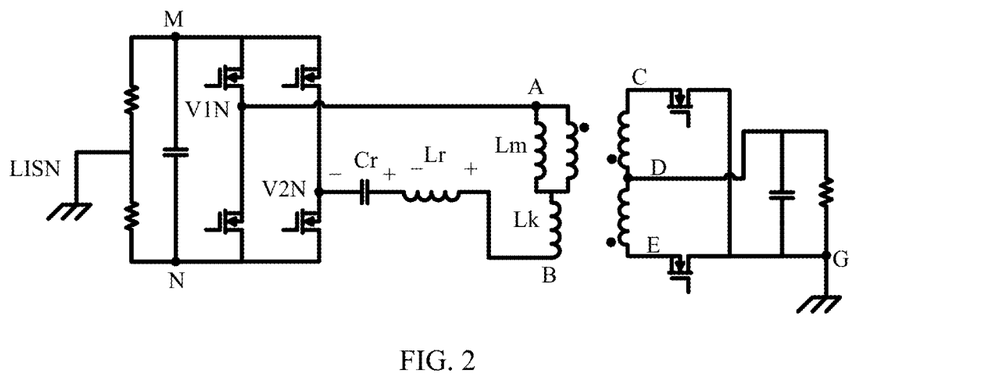
FIG. 2 is a schematic diagram of a full-bridge LLC resonant DC/DC converter according to an embodiment of this application.

FIG. 2 is a schematic diagram of a full-bridge LLC resonant DC/DC converter according to an embodiment of this application.

A working principle of the LLC resonant DC/DC converter is as follows: An input direct current is converted into an alternating current. After passing through the transformer, the alternating current is transmitted to a rectifier circuit at an output terminal. The rectifier circuit rectifies the alternating current into a direct current, and then outputs the direct current. Due to isolation of the transformer, an interference signal can be isolated. Therefore, an interference signal of a primary-side winding of the transformer cannot be transmitted to a secondary-side winding of the transformer.

The primary-side winding of the transformer in FIG. 2 includes an exciting winding Lm. In addition, a leakage inductor Lk of the primary-side winding and the secondary-side winding of the transformer is also drawn at a location of the primary-side winding of the transformer.

A resonant inductor Lr and a resonant capacitor Cr are connected in series to the primary-side winding of the transformer, to obtain LLC resonance.

In FIG. 2, an example in which the secondary-side winding of the transformer is connected to a full-wave rectifier circuit is used for description.

The primary-side winding of the transformer. Lr, and Cr are connected between a first node and a second node after being connected in series. As shown in the figure, the first node is a midpoint V1N of a first bridge arm of a full bridge, and the second node is a midpoint V2N of a second bridge arm of the full bridge.

The secondary-side winding of the transformer is connected between a third node C and a fourth node E. When the rectifier circuit at the output terminal of the DC/DC converter is a full-wave rectifier circuit, the secondary-side winding of the transformer further includes a central tap. In other words, a node D is a leading-out terminal of the central tap of the secondary-side winding. In FIG. 2, a node D and a node G are respectively a positive electrode and a negative electrode of the output terminal of the DC/DC converter. The negative electrode is grounded.

A primary-side quiescent point of the transformer is a positive electrode (a node M) or a negative electrode (N) at an input terminal of the DC/DC converter. A secondary-side quiescent point of the transformer is the positive electrode (the node D) or the ground at the output terminal of the DC/DC converter.

The quiescent point in this embodiment of this application refers to a point at a zero potential in an alternating current small signal model. For a ground potential GND, a potential of the quiescent point is a direct current stable potential. In other words, for the GND, a direct current potential of the quiescent point is stable. As the name implies, a potential of a moving point fluctuates relative to that of the quiescent point. For example, for the transformer, potentials of the node C and the node E fluctuate and belong to alternating current potentials. Therefore, the node C and the node E are secondary-side moving points of the transformer, but the node A and the node B are primary-side moving points of the transformer.

The foregoing describes a structure of the full-bridge LLC resonant DC/DC converter according to some embodiments. The following describes structures of two half-bridge LLC resonant DC/DC converters.

Figure 3:
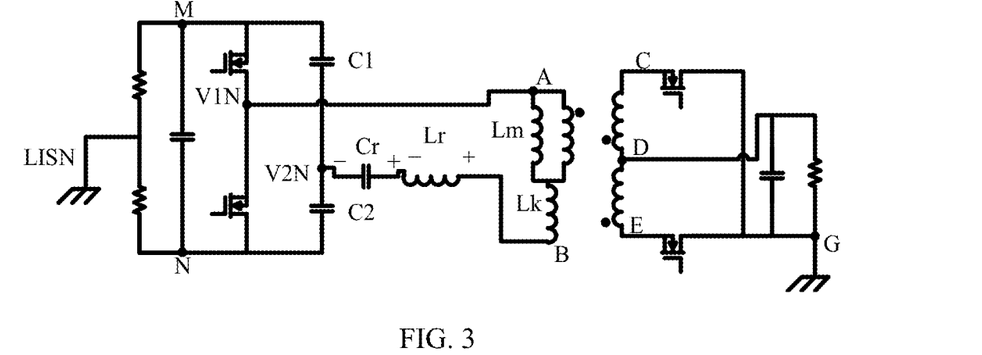
FIG. 3 is a schematic diagram of a half-bridge LLC resonant DC/DC converter according to an embodiment of this application.

FIG. 3 is a schematic diagram of a half-bridge LLC resonant DC/DC converter according to an embodiment of this application.

In the half-bridge LLC resonant DC/DC converter shown in FIG. 3, a conversion circuit connected to a primary side of the transformer has one bridge arm. One terminal of a primary-side winding of the transformer is connected to a midpoint V1N of the bridge arm. The other terminal of the primary-side winding of the transformer is connected to a common terminal V2N of a capacitor C1 and a capacitor C2.

The connection relationship may be the same as that illustrated in FIG. 2. Details are not described herein.

Figure 4:
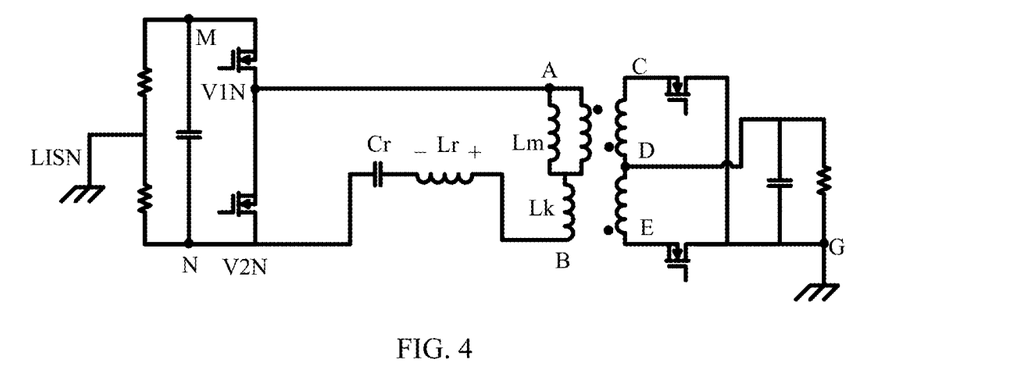
FIG. 4 is a schematic diagram of another half-bridge LLC resonant DC/DC converter according to an embodiment of this application.

FIG. 4 is a schematic diagram of another half-bridge LLC resonant DC/DC converter according to an embodiment of this application.

A difference between the half-bridge LLC resonant DC/DC converter shown in FIG. 4 and that shown in FIG. 3 is that both terminals of a primary-side winding are connected to a same bridge arm. One terminal of the primary-side winding is connected to a midpoint V1N of the bridge arm. The other terminal of the primary-side winding is connected to another output terminal V2N of the bridge arm.

FIG. 3 and FIG. 4 are two topological forms in which the half-bridge LLC resonant DC/DC converters are connected to the primary-side windings. A difference between FIG. 4 and FIG. 3 is a location connected to V2N.

Figure 5:
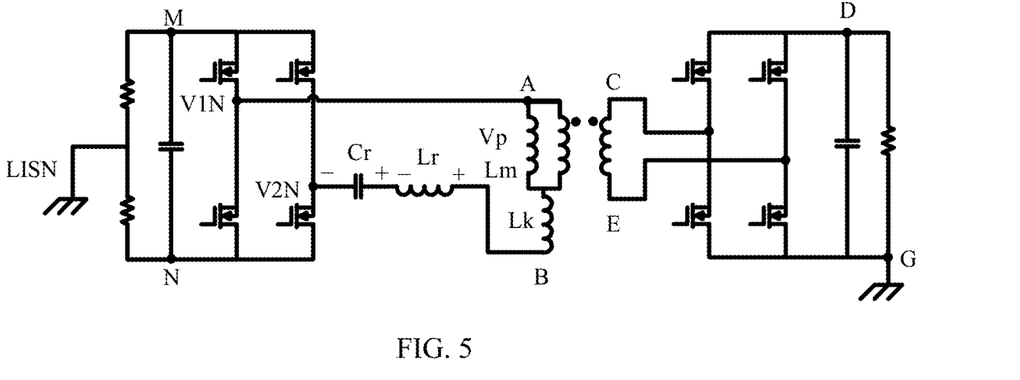
FIG. 5 is a schematic diagram of another full-bridge LLC resonant DC/DC converter according to an embodiment of this application.

FIG. 5 is a schematic diagram of another full-bridge LLC resonant DC/DC converter according to an embodiment of this application.

All rectifier circuits connected to secondary-side windings shown in FIG. 2 to FIG. 4 are full-wave rectifier circuits. A rectifier circuit shown in FIG. 5 is a full-bridge rectifier circuit.

A first terminal C of a secondary-side winding is connected to a first input terminal of the full-bridge rectifier circuit. A second terminal E of the secondary-side winding is connected to a second input terminal of the full-bridge rectifier circuit. A positive electrode of an output terminal of the full-bridge rectifier circuit is a node D. A negative electrode of the output terminal of the full-bridge rectifier circuit is a node G, that is, a ground.

The node D and the node G may be connected to a load, that is, a power-consuming device.

In the foregoing several topologies of the DC/DC converter, switching transistors, resonant inductors, resonant capacitors, and transformer leakage inductors are all sources of a common mode noise. In a process of transmitting energy by the transformer, the common mode noise is transmitted from the primary-side winding to the secondary-side winding, which is used as an interference transmission path.

Therefore, some of the technical solutions provided in the embodiments of this application are as follows: When a first parasitic capacitance $C_{AD}$ between a first terminal of the primary-side winding of the transformer and the secondary-side quiescent point is equal to a second parasitic capacitance $C_{BD}$ between a second terminal of the primary-side winding and the quiescent point of the secondary-side winding, that is, $C_{AD}=C_{BD}$, the two moving nodes A and B of the primary-side winding of the transformer are symmetrical relative to the quiescent point D of the secondary-side winding. Then, a signal source is added to cancel the common mode interference in the DC/DC converter in a full load range. The following describes in detail with reference to the accompanying drawings. It should be noted that the technical solutions provided in all the embodiments of this application are applicable to the DC/DC converter in any topology form in FIG. 2 to FIG. 5.

Embodiment 1 of a DC/DC Converter 200

Figure 6:
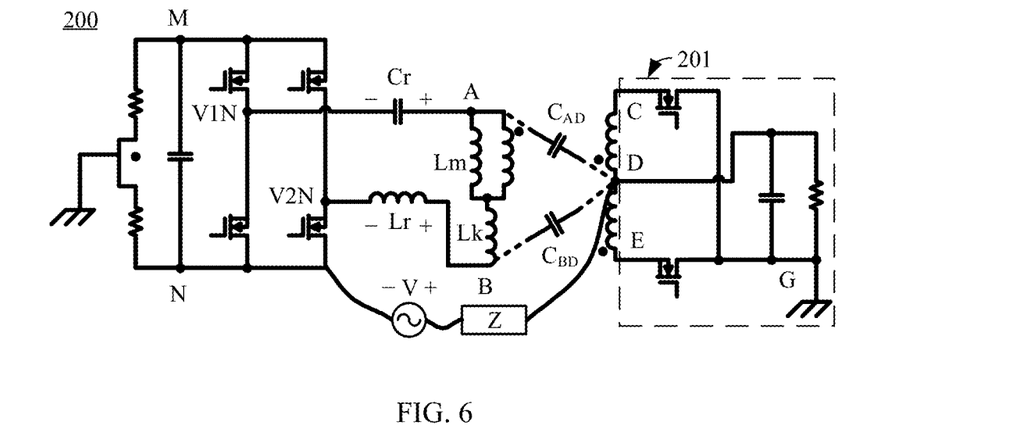
FIG. 6 is a schematic diagram of a DC/DC converter according to an embodiment of this application.

FIG. 6 is a schematic diagram of a DC/DC converter 200 according to an embodiment of this application.

In this embodiment, the DC/DC converter is a full-bridge LLC resonant DC/DC converter, and a rectifier circuit 201 connected to a secondary-side winding is a full-wave rectifier circuit 201.

The DC/DC converter 200 provided in this embodiment includes a primary-side winding, a secondary-side winding, a resonant inductor Lr, a resonant capacitor Cr, and a noise suppression network.

To facilitate analysis of a working principle of the DC/DC converter 200, that the noise suppression network may include a signal source V and an impedance network Z is used as an example for description. The signal source V is configured to generate a voltage signal and a current signal. The impedance network Z is configured to match a suppression current output by the noise suppression network.

The primary-side winding, the resonant inductor Lr, and the resonant capacitor Cr are connected between a first node V1N and a second node V2N after being connected in series.

The secondary-side winding is connected between a third node D and a fourth node E.

The primary-side winding and the secondary-side winding form a transformer.

The signal source V is connected between a primary-side quiescent point and a secondary-side quiescent point of the transformer. The primary-side quiescent point is a direct current stable potential at an input terminal of the DC/DC converter 200. The secondary-side quiescent point is a direct current stable potential at an output terminal of the DC/DC converter 200. For example, the primary-side quiescent point is a positive electrode M or a negative electrode N at the input terminal of the DC/DC converter 200. The secondary-side quiescent point is a positive electrode D or a ground G at the output terminal of the DC/DC converter 200.

A first parasitic capacitance between a first terminal of the primary-side winding and the secondary-side quiescent point is equal to a second parasitic capacitance between a second terminal of the primary-side winding and the secondary-side quiescent point.

The noise suppression network is configured to generate a suppression current. A direction of the suppression current is opposite to a direction of a total noise current generated by the resonant inductor and the resonant capacitor. The suppression current is used to suppress the total noise current generated by the resonant inductor and the resonant capacitor. A voltage of the noise suppression network varies with a size of a load.

The signal source V in FIG. 6 is described by using an example in which the signal source V is connected to the primary-side quiescent point N and the secondary-side quiescent point D. Alternatively: the signal source V may be connected between the primary-side quiescent point M and the secondary-side quiescent point G.

In some applications, a parasitic capacitor exists between the primary-side winding and the secondary-side winding of the transformer. To facilitate description, as shown in FIG. 6, the parasitic capacitor is equivalent to a first parasitic capacitance $C_{AD}$ between the first terminal (that is, a node A) of the primary-side winding and the secondary-side quiescent point D, and a second parasitic capacitance $C_{BD}$ between the second terminal (that is, a node B) of the primary-side winding and the secondary-side quiescent point D. That is, the parasitic capacitor is equivalent to that between the node A and the node B of the primary-side winding of the transformer and the node D of the secondary-side winding. In practice, the parasitic capacitance may be evenly distributed between the primary-side winding and the secondary-side winding.

In some designs, it is difficult to achieve complete symmetry. In other words, the first parasitic capacitance $C_{AD}$ is not equal to the second parasitic capacitance $C_{BD}$. Therefore, a channel of a common mode noise appears between the primary-side winding and the secondary-side winding of the transformer. However, $C_{AD}=C_{BD}$ may be implemented by adding a balance capacitance. When the transformer is symmetrical, if a source signal of the common mode noise is balanced, the common mode noise can be cancelled. In addition, a common mode noise generated by a leakage inductor of a transformer may also be canceled on the symmetrical transformer. The balance capacitance may be added between the node A and the node D, or between the node B and the node D. Specifically, a value relationship between $C_{AD}$ and $C_{BD}$ may be analyzed. After the balance capacitance is added. $C_{AD}=C_{BD}$ may be implemented.

When the LLC resonant DC/DC converter 200 works in a resonant state, a total noise of Lk+Lr and a total noise of Cr are equal in signal amplitude and opposite in phase, so that VLr+VCr+VLk=0). Lk may be evenly distributed in the transformer, and Lk is non-negligible. Therefore. Lr and Cr may have different noise amplitudes, and cancellation may not be implemented, that is. VLr+VCr≠0). In addition, an amplitude of a current component on Lk varies with a size of a load, and is not a fixed value. In other words, the size of the load affects the current component on Lk, thereby affecting an amplitude of VLr+VCr. A larger current flowing through Lk represents a larger proportion of Lk in (Lk+Lr), and therefore an impact of Lk as a noise source is non-negligible.

In this technical solution, in addition to the balance capacitance, the DC/DC converter 200 further includes the noise suppression network. The noise suppression network may generate the suppression current. The direction of the suppression current is opposite to the direction of the total noise current generated by the resonant inductor and the resonant capacitor. Therefore, the total noise current generated by the resonant inductor and the resonant capacitor can be suppressed. A current source of the noise suppression network may be additionally added, or may come from energy inside the DC/DC converter 200. The noise suppression network is connected between the primary-side quiescent point and the secondary-side quiescent point of the transformer. Therefore, a common mode noise caused by a resonant circuit on the parasitic capacitor between the primary-side winding and the secondary-side winding of the transformer can be effectively reduced. In addition, the voltage of the noise suppression network varies with the size of the load. Therefore, the noise suppression network can be applied to suppress a common mode noise in a full load range.

When a load changes, a current changes. Voltage amplitudes of inductors (Lr and Lk) are proportional to the current. Therefore, voltage amplitudes of Lk, Lr, and Cr all vary with the load. The voltage of the noise suppression network provided in these embodiments vary with the size of the load. Therefore, suppression of the common mode noise in the full load range can be implemented. Regardless of the size of the load, the noise suppression network can automatically adjust output of the noise suppression network based on the size of the load. Therefore, the common mode noise in the full load range can be cancelled.

The following describes an implementation in which a signal source internally couples energy from a DC/DC converter 200. The energy may be coupled from a resonant inductor or from a resonant capacitor, which are separately described below in detail with reference to the accompanying drawings.

Embodiment 2 of a DC/DC Converter 200

In this embodiment, that a signal source couples energy from a resonant inductor is used as an example for description.

Figure 7:
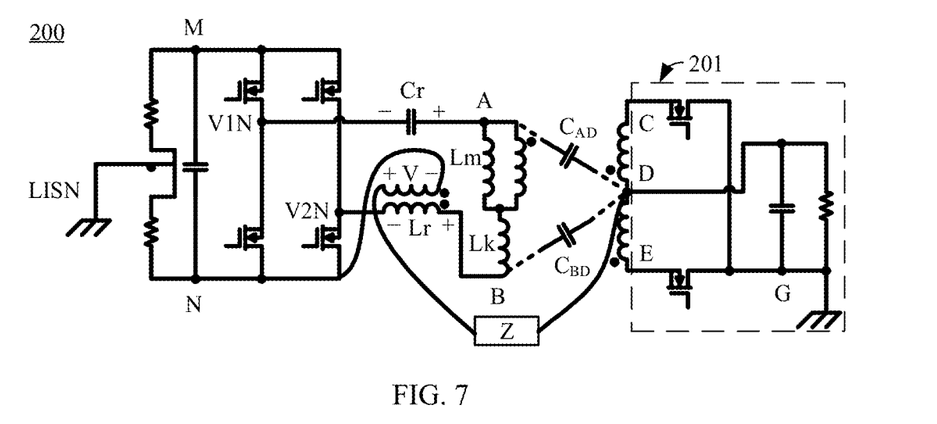
FIG. 7 is a schematic diagram of a DC/DC converter in which a signal source couples energy from a resonant inductor according to an embodiment of this application.

FIG. 7 is a schematic diagram of a DC/DC converter 200 in which a signal source couples energy from a resonant inductor according to an embodiment of this application.

The signal source provided in this embodiment includes an impedance network Z and a cancellation inductor. As shown in the figure, an inductance is coupled to the cancellation inductor is V.

The cancellation inductor may be a winding. The cancellation inductor couples energy from the resonant inductor Lr. In embodiments, the cancellation inductor and Lr may be wound on a same magnetic core, in other words, the cancellation inductor and Lr share the magnetic core.

Figure 8:
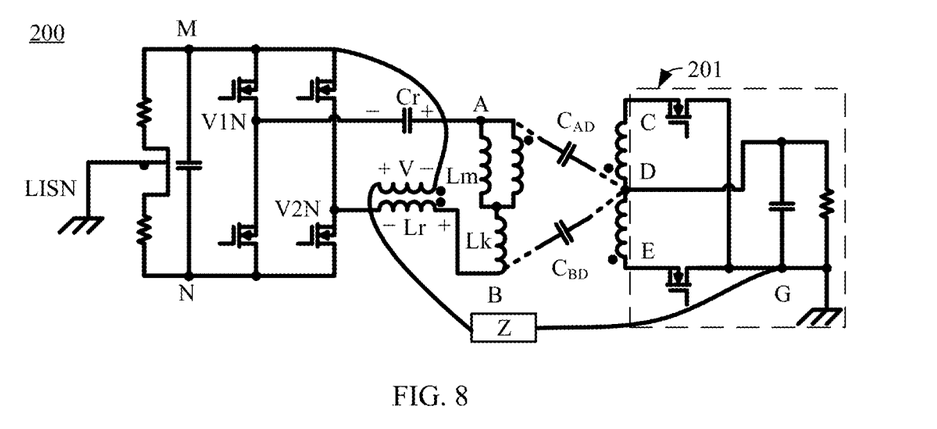
FIG. 8 is a schematic diagram of another DC/DC converter in which a signal source couples energy from a resonant inductor according to an embodiment of this application.

After being connected in series to the impedance network Z, the cancellation inductor is connected between the primary-side quiescent point N and the secondary-side quiescent point D. In FIG. 7, the signal source is connected between the node N and the node D. Alternatively, as shown in FIG. 8, the signal source may be connected between the primary-side quiescent point M and the secondary-side quiescent point G.

A voltage amplitude V of the cancellation inductor is directly proportional to the voltage amplitude of the resonant inductor Lr.

The impedance network Z is configured to adjust a voltage amplitude of the signal source between the primary-side quiescent point and the secondary-side quiescent point.

Implementations of the impedance network Z are not specifically limited in this embodiment. The impedance network Z is a two-port network, and may be connected in series to the cancellation inductor. For example, the impedance network Z may include at least one of a resistor, an inductor, and a capacitor. In other words, the impedance network Z may be at least one, two, or three of the above three. For example, Z may include the inductor, or may include the inductor and the resistor, or may include the capacitor and the resistor, or may include the inductor and the capacitor, or may include all of the inductor, the resistor, and the capacitor.

It may be learned from FIG. 7 that the voltage V coupled from Lr by the cancellation inductor has an opposite direction to voltages on both terminals of Lr. A dotted terminal of the cancellation inductor is connected to the primary-side quiescent point M. A non-dotted terminal of the cancellation inductor is connected to the secondary-side quiescent point G by using the impedance network Z. In other words, the dotted terminal of the cancellation inductor is close to the primary-side quiescent point. The non-dotted terminal of the cancellation inductor is close to the secondary-side quiescent point.

A Line Impedance Stabilization Network (LISN) in FIG. 7 is grounded, indicating that a LISN in an electromagnetic compatibility (EMC) test is grounded.

Figure 9A:
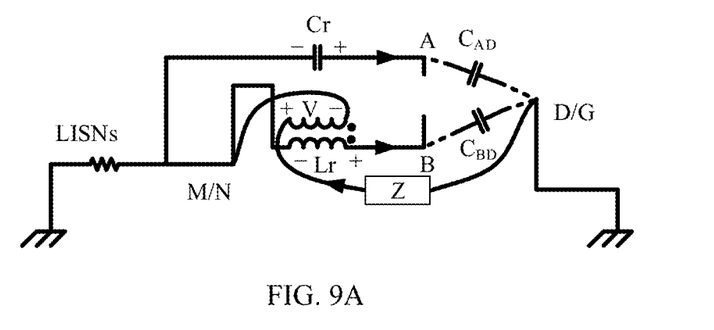
FIG. 9A is a schematic diagram of a small signal model corresponding to FIG. 7 and FIG. 8 according to an embodiment of this application.

FIG. 9A is a schematic diagram of a small signal model corresponding to FIG. 7 and FIG. 8.

The following analysis is with reference to the small signal model shown in FIG. 9A. In the small signal model shown in FIG. 9A, V1N and V2N are short-circuited together, and this does not affect calculation of V.

First, V1N and V2N are equal in signal amplitude and opposite in phase. Therefore, when $C_{AD}=C_{BD}$, a noise generated on V1N and a noise generated on V2N cancel each other.

Second, Lk is evenly distributed inside the transformer. When parasitic capacitances at both terminals of the transformer are balanced, that is, $C_{AD}=C_{BD}$, a noise generated by Lk is cancelled.

Third, to implement a better noise reduction effect, a sum of a total noise current generated on a parasitic capacitor by the resonant inductor and the resonant capacitor and a current of a cancellation impeder is zero. The parasitic capacitor is a parasitic capacitor between the primary-side winding and the secondary-side winding. That is, an expression is as follows:

$V_C/Z1+V_L/Z2+V/Z=0$, where $V_C$ indicates voltages at both terminals of the resonant capacitor, $V_L$ indicates inductances at both terminals of the resonant inductor, Z1 indicates an impedance presented by $C_{AD}$, and Z2 indicates an impedance presented by $C_{BD}$.

The cancellation inductor is inversely coupled to the resonant inductor Lr. Therefore, $V=-n1V_L$, where n1 indicates a ratio of a number of turns of the cancellation inductor to that of the resonant inductor Lr.

During actual working, when the DC/DC converter 200 works at a resonance frequency, a voltage $V_L$ of the resonant inductor, a voltage $V_C$ of the resonant capacitor, and a voltage $V_{Lk}$ of the leakage inductor of the transformer meet the following relationship: $V_L+V_{Lk}-V_C=0$.

It should be noted that during actual operation, the DC/DC converter 200 does not necessarily completely work at the resonance frequency, and may approximately work at the resonance frequency. For example, $V_L+V_{Lk}-V_C$ is approximately equal to 0.

The leakage inductor Lk of the transformer is connected in series to the resonant inductor Lr. Therefore, $V_C=V_L+V_{Lk}=(1+n)V_L$ is met, where $n=V_{Lk}/V_L$.

Because $C_{AD}=C_{BD}$, $Z=[n1/(n+2)]Z1$.

Therefore, an impedance presented by the impedance network may be obtained based on the foregoing formulas.

According to the technical solution provided in this embodiment, the signal source couples energy from the resonant inductor, and no additional signal source needs to be added facilitating for easy implementation. A cancellation inductor is wound on the magnetic core of the resonant inductor, and energy is coupled from only the resonant inductor. An amplitude of a received signal may be adjusted by using the impedance network Z connected in series to the cancellation inductor. Currents passing through Cr and Lr both vary with a load, so that an amplitude of the voltage coupled to the cancellation inductor varies with the currents. Therefore, this solution is applicable to noise suppression in a full load range.

A comparison table between the technical solution provided in this embodiment and a case in which no signal source is set for noise cancellation and reduction is provided as follows:

TABLE 1

| | | Ite | em | | |
|---|---|---|---|---|---|
| Without noise cancellation and reduction | | | With noise cancellation and reduction | | |
| Component | | | | | |
| Common mode inductor | Common mode capacitor | Differential mode capacitor | Common mode inductor | Common mode capacitor | Differential mode capacitor |
| Cardinality | 2 | 4 | 4 | 1 | 32 | 4 |
| Component area mm² | 38*30*2 | 5.7*5.0 | 3.2*2.5 | 31*17.5 | 3.2*2.5 | 3.2*2.5 |
| Total component area mm² | | 2426 | | | 830 | |

It can be learned by analyzing data in Table 1 that: when noise cancellation and reduction are performed by using the signal source provided in this embodiment of this application, an area of a circuit board occupied by a filter circuit may be reduced to almost one third of a previous area, in other words, the area is reduced by ⅔. In other words, in this solution, while the common mode noise is suppressed, the area of the circuit board is further reduced, and an effect is significant. This facilitates miniaturization of the DC/DC converter 200, and facilitates miniaturization of an entire communication power supply.

In the foregoing embodiment, energy is coupled from the resonant inductor Lr by using the cancellation inductor. Alternatively, energy may be coupled from the resonant inductor by using a capacitive coupling circuit.

Figure 9B:
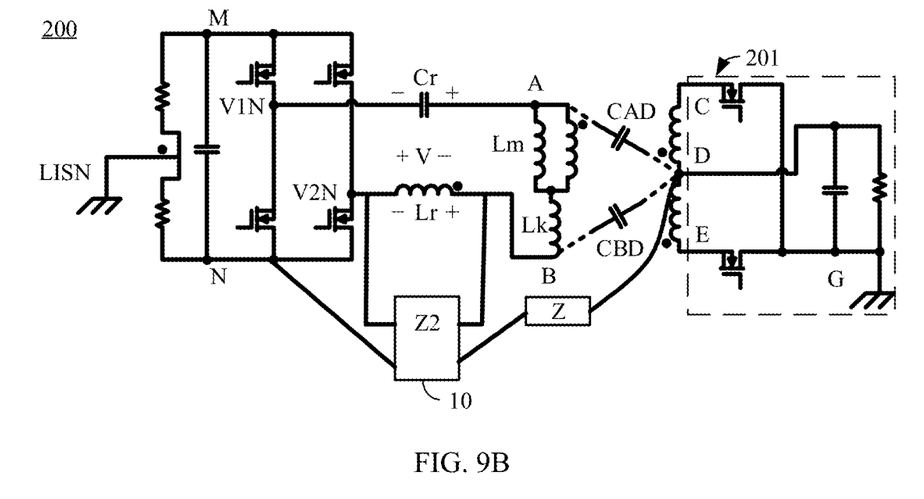
FIG. 9B is a schematic diagram in which a capacitive coupling circuit couples energy from a resonant inductor according to an embodiment of this application.

FIG. 9B is a schematic diagram in which a capacitive coupling capacitor couples energy from a resonant inductor according to an embodiment of this application.

Based on the DC/DC converter 200 provided in this embodiment, the signal source may include a first capacitive coupling circuit Z2.

The first capacitive coupling circuit Z2 couples energy from the resonant inductor Lr. After being connected in series to the impedance network Z, the first capacitive coupling circuit Z2 is connected between the primary-side quiescent point N and the secondary-side quiescent point D. Alternatively, after being connected in series to Z, Z2 may be connected between another primary-side quiescent point and another secondary-side quiescent point. A connection manner is not limited to that shown in FIG. 9B.

The foregoing describes coupling energy from the resonant point inductor. The following describes coupling energy from the resonant capacitor.

Embodiment 3 of a DC/DC Converter 200

Figure 10:
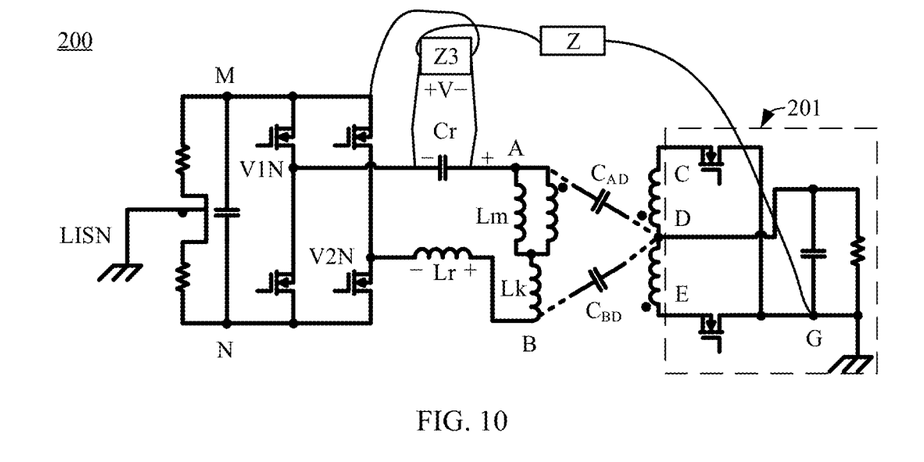
FIG. 10 is a schematic diagram of a DC/DC converter in which a signal source couples energy from a resonant capacitor according to an embodiment of this application.

FIG. 10 is a schematic diagram of a DC/DC converter 200 in which a signal source couples energy from a resonant capacitor according to an embodiment of this application.

This embodiment describes an example in which the signal source couples energy from the resonant capacitor Cr. A voltage amplitude V of the signal source is directly proportional to the voltage amplitude of the resonant capacitor Cr.

When the signal source couples energy from the resonant capacitor Cr, the signal source may include a second capacitive coupling circuit Z3.

The second capacitive coupling circuit Z3 couples energy from the resonant capacitor Cr. In other words, both terminals of the second capacitive coupling circuit Z3 are respectively connected to both terminals of Cr. After being connected in series to the impedance network Z. Z3 is connected between the primary-side quiescent point and the secondary-side quiescent point.

Figure 11A:
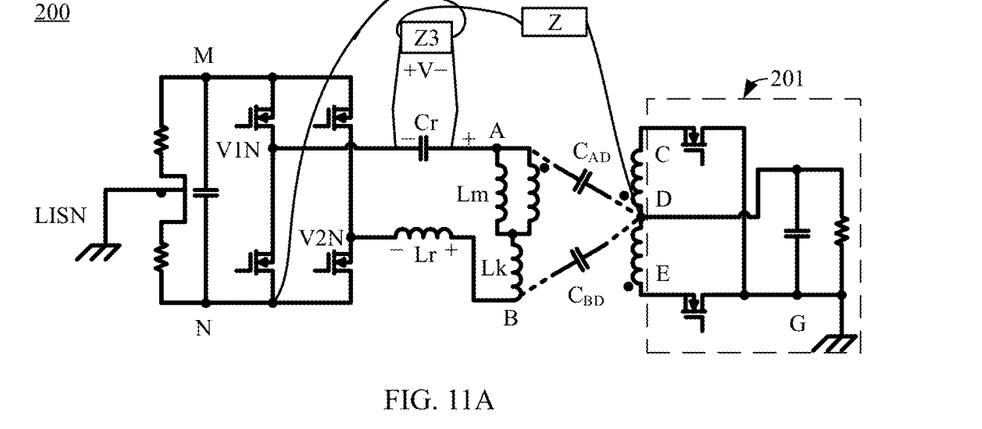
FIG. 11A is a schematic diagram of another DC/DC converter in which a signal source couples energy from a resonant capacitor according to an embodiment of this application.

For example, in FIG. 10, after being connected in series to Z, Z3 is connected between the primary-side quiescent point M and the secondary-side quiescent point G. Alternatively, as shown in FIG. 11A, after being connected in series to Z, Z3 is connected between the primary-side quiescent point N and the secondary-side quiescent point D. FIG. 11A is a schematic diagram of another DC/DC converter 200 in which a signal source couples energy from a resonant capacitor according to an embodiment of this application.

The following analyzes a working principle according to some embodiments.

First, V1N and V2N are equal in signal amplitude and opposite in phase. Therefore, when $C_{AD}=C_{BD}$, a noise generated on V1N and a noise generated on V2N cancel each other.

Second, Lk is evenly distributed inside the transformer. When parasitic capacitances at both terminals of the transformer are balanced, that is, $C_{AD}=C_{BD}$, a noise generated by Lk is cancelled.

Third, to implement a better noise reduction effect, a sum of a total noise current generated on a parasitic capacitor by the resonant inductor and the resonant capacitor and a current of a cancellation impeder is zero. The parasitic capacitor is a parasitic capacitor between the primary-side winding and the secondary-side winding. That is, an expression is as follows:

$$V_C/Z1+V_L/Z2+V/Z=0, \text{ where}$$

$V_C$ indicates voltages at both terminals of the resonant capacitor, $V_L$ indicates inductances at both terminals of the resonant inductor, Z1 indicates an impedance presented by $C_{AD}$, and Z2 indicates an impedance presented by $C_{BD}$.

The cancellation impeder is inversely coupled to the resonant capacitor Cr. Therefore, $V=-n2V_C$, where n2 indicates a ratio of a coupling voltage of the cancellation impeder to voltages at both terminals of Cr.

During actual working, when the DC/DC converter 200 works at a resonance frequency, $V_L+V_{Lk}-V_C=0$.

The leakage inductor Lk of the transformer is connected in series to the resonant inductor Lr. Therefore, $V_C=V_L+V_{Lk}=(1+n)V_L$ is met, where $n=V_{Lk}/V_L$.

Because $C_{AD}=C_{BD}$, $Z=[n2(n+1)/(n+2)]Z1$.

An impedance presented by the impedance network may be obtained based on the foregoing formulas.

Figure 11B:
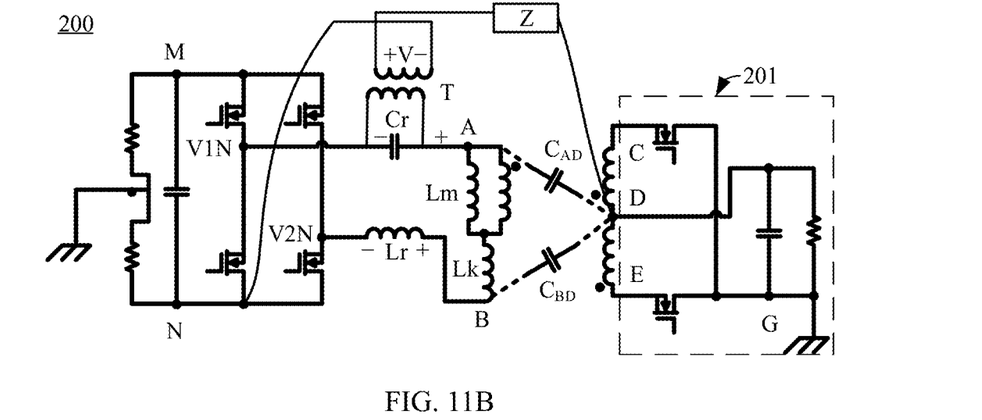
FIG. 11B is a schematic diagram in which a signal coupling transformer couples energy from a resonant capacitor according to an embodiment of this application.

Based on the foregoing described implementation, the capacitive coupling capacitor couples energy from the resonant capacitor. Alternatively, the transformer may couple energy from the resonant capacitor. For details, refer to FIG. 11B. FIG. 11B is a schematic diagram in which a signal coupling transformer couples energy from a resonant capacitor according to an embodiment of this application.

The signal source includes a signal coupling transformer T.

A primary-side winding of the signal coupling transformer T couples energy from the resonant capacitor Cr. After being connected in series to the impedance network Z, a secondary-side winding of the signal coupling transformer T is connected between the primary-side quiescent point and the secondary-side quiescent point.

For example, in FIG. 11B, after being connected in series to the impedance network Z, the secondary-side winding of T is connected between the primary-side quiescent point M and the secondary-side quiescent point D. Alternatively, the secondary-side winding of T may be connected to another quiescent point. Details are not described herein.

According to the technical solution provided in this embodiment, the signal source couples energy from the resonant capacitor, and no additional signal source needs to be added, facilitating for easy implementation. The cancellation impeder is connected in parallel to both terminals of the resonant capacitor, and energy is coupled from only the resonant capacitor. An amplitude of a received signal may be adjusted by using the impedance network Z connected in series to the cancellation impeder. Currents passing through Cr and Lr both vary with a load, so that an amplitude of the voltage coupled to the cancellation impeder varies with the currents. Therefore, this solution is applicable to noise suppression in a full load range.

Figure 12:
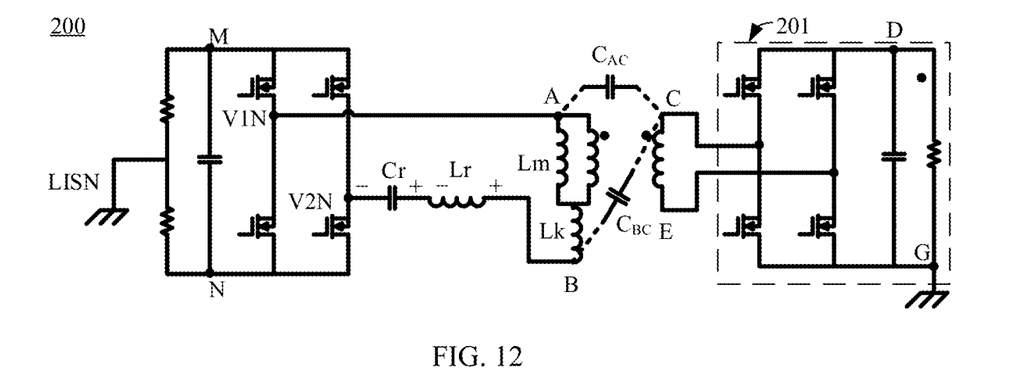
FIG. 12 is an equivalent schematic diagram of a full-bridge LLC resonant DC/DC converter according to an embodiment of this application.
Figure 13:
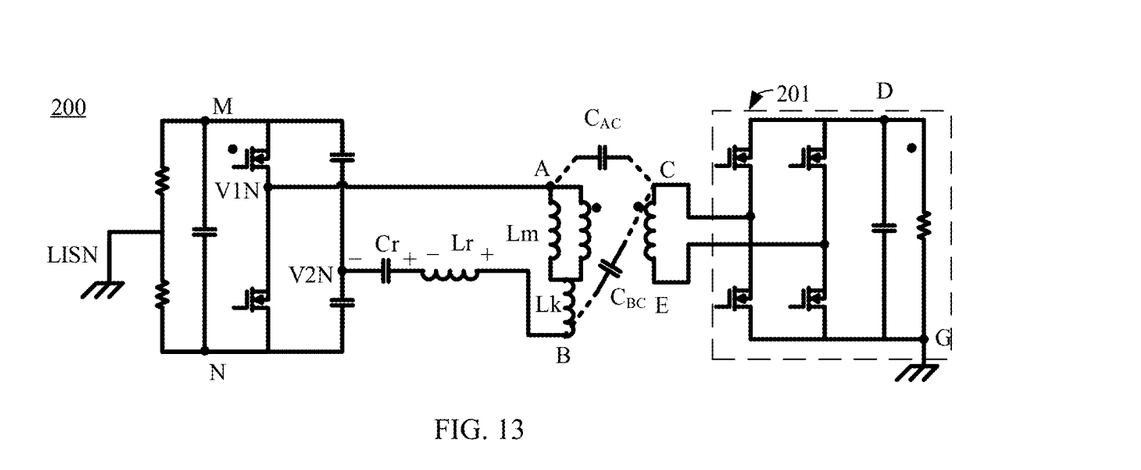
FIG. 13 is an equivalent schematic diagram of a half-bridge LLC resonant DC/DC converter according to an embodiment of this application.

The foregoing describes the working principle by using an example in which the secondary-side winding of the transformer is connected to the full-wave rectifier circuit 201. When the secondary-side winding of the transformer is connected to the full-bridge rectifier circuit 201. FIG. 12 and FIG. 13 show an equivalent form of a parasitic capacitor between the primary-side winding and the secondary-side winding of the transformer. FIG. 12 is a schematic diagram in which a primary-side winding of a transformer is connected to a full-bridge LLC resonant circuit. FIG. 13 is a schematic diagram in which a primary-side winding of a transformer is connected to a half-bridge LLC resonant circuit.

Two parasitic capacitors are included in each of FIG. 12 and FIG. 13, and are respectively $C_{AC}$ and $C_{BC}$, to be specific, are a parasitic capacitor $C_{AC}$ between a first terminal of the primary-side winding and a first terminal of the secondary-side winding and a parasitic capacitor $C_{BC}$ between a second terminal of the primary-side winding and the first terminal of the secondary-side winding.

Similar to FIG. 6, for topologies shown in FIG. 12 and FIG. 13, the transformer is symmetrical when the first parasitic capacitance between the first terminal of the primary-side winding and the quiescent point of the secondary-side winding is equal to the second parasitic capacitance between the second terminal of the primary-side winding and the quiescent point of the secondary-side winding, that is, $C_{AC}=C_{BC}$. $C_{AC}=C_{BC}$ may be implemented by adding a balance capacitance. In other words, a balance capacitance is added between A and C, or between B and C. In this embodiment of this application, on a basis of $C_{AC}=C_{BC}$, in addition to the balance capacitance, a noise suppression network is further added. The noise suppression network may generate a suppression current. A direction of the suppression current is opposite to a direction of a total noise current generated by the resonant inductor and the resonant capacitor. Therefore, the total noise current generated by the resonant inductor and the resonant capacitor can be suppressed. A current source of the noise suppression network may be additionally added, or may come from energy inside the DC/DC converter 200. The noise suppression network is connected between the primary-side quiescent point and the secondary-side quiescent point of the transformer. Therefore, a common mode noise caused by a resonant circuit on the parasitic capacitor between the primary-side winding and the secondary-side winding of the transformer can be effectively reduced. In addition, a voltage of the noise suppression network varies with a size of a load. Therefore, the noise suppression network can be applied to suppress a common mode noise in a full load range.

The technical solutions in the foregoing embodiments may be used interactively if being not parallel implementations, and are not specifically limited.

Embodiment of a Communication Power Supply

Based on the DC/DC converter 200 provided in the foregoing embodiments, an embodiment of this application further provides a communication power supply, which is described in detail below with reference to the accompanying drawing.

Figure 14:
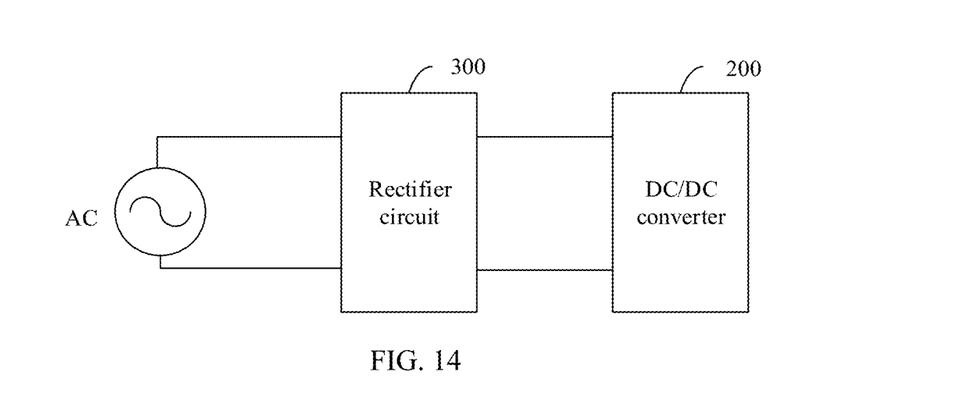
FIG. 14 is a schematic diagram of a communication power supply according to an embodiment of this application.

FIG. 14 is a schematic diagram of a communication power supply according to an embodiment of this application.

The communication power supply provided in this embodiment includes the DC/DC converter 200 described in any one of the foregoing embodiments, and further includes a rectifier circuit 300.

A first terminal of the rectifier circuit 300 is configured to connect to an alternating current power supply AC. The rectifier circuit 300 is configured to convert an alternating current of the alternating current power supply AC into a direct current.

A second terminal of the rectifier circuit 300 is configured to connect to a first terminal of the DC/DC converter 200. A second terminal of the DC/DC converter 200 is configured to supply power to a load.

The DC/DC converter 200 is configured to: after converting the direct current, provide an obtained current to the load.

The load may be any power-consuming device. In other words, the DC/DC converter 200 may output different voltages based on different loads, for example, may output voltages such as 48 V, 12 V, 5 V, and 3.3 V.

For the communication power supply provided in this embodiment of this application, a noise suppression network is added in the DC/DC converter of the communication power supply. The noise suppression network may generate a suppression current. A direction of the suppression current is opposite to a direction of a current of a resonant inductor and a resonant capacitor. Therefore, a total noise current generated by the resonant inductor and the resonant capacitor can be suppressed. A current source of the noise suppression network may be additionally added, or may come from energy inside the DC/DC converter. The noise suppression network is connected between a primary-side quiescent point and a secondary-side quiescent point of a transformer. Therefore, a common mode noise caused by a resonant circuit on a parasitic capacitor between a primary-side winding and a secondary-side winding of the transformer can be effectively reduced. In addition, a voltage of the noise suppression network varies with the size of the load. Therefore, the noise suppression network can be applied to suppress a common mode noise in a full load range. Therefore, the communication power supply including the DC/DC converter can achieve a better suppression effect on the common mode noise, thereby providing a higher quality power supply for the load.

It should be understood that, in this application, "at least one" means one or more, and "a plurality of" means two or more. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The above are merely preferred examples of this application rather than limitations on this application in any form. Although the embodiments of this application have been disclosed above as preferred embodiments, the foregoing embodiments of this application are not intended to limit the embodiments of this application. Therefore, any simple amendments, equivalent variations, and modifications made on the above embodiments according to the technical essence of this application without departing from the content of the technical solutions of this application shall fall within the protection scope of the technical solutions of this application.

What is claimed is:

1. A DC/DC converter, comprising: a primary-side winding, a secondary-side winding, a resonant inductor, a resonant capacitor, and a noise suppression network, wherein:
   the primary-side winding and the secondary-side winding form a transformer;
   the noise suppression network is connected between a primary-side quiescent point and a secondary-side quiescent point of the transformer, the primary-side quiescent point is a direct current stable potential at an input terminal of the DC/DC converter, and the secondary-side quiescent point is a direct current stable potential at an output terminal of the DC/DC converter;
   a first parasitic capacitance between a first terminal of the primary-side winding and the secondary-side quiescent point is equal to a second parasitic capacitance between a second terminal of the primary-side winding and the secondary-side quiescent point;
   the noise suppression network is configured to generate a suppression current, a direction of the suppression current is opposite to a direction of a total noise current generated by the resonant inductor and the resonant capacitor, and
   the noise suppression network comprises a signal source and an impedance network; and
   the signal source and the impedance network are connected between the primary-side quiescent point and the secondary-side quiescent point after being connected in series.

2. The DC/DC converter according to claim 1, wherein:
   the signal source couples energy from the resonant inductor; and
   a voltage amplitude of the signal source is directly proportional to a voltage amplitude of the resonant inductor.

3. The DC/DC converter according to claim 2, wherein the signal source comprises a cancellation inductor, wherein:
   the cancellation inductor is configured to couple energy from the resonant inductor, and the cancellation inductor is connected between the primary-side quiescent point and the secondary-side quiescent point after being connected in series to the impedance network.

4. The DC/DC converter according to claim 3, wherein the cancellation inductor and the resonant inductor are wound on a same magnetic core.

5. The DC/DC converter according to claim 4, wherein:
   a sum of a total noise current generated on the first parasitic capacitance and the second parasitic capacitance by the resonant inductor and the resonant capacitor and a current of a cancellation impeder is zero; and
   the parasitic capacitor is between the primary-side winding and the secondary-side winding.

6. The DC/DC converter according to claim 3, wherein:
   a sum of a total noise current generated on the first parasitic capacitance and the second parasitic capacitance by the resonant inductor and the resonant capacitor and a current of a cancellation impeder is zero; and
   the parasitic capacitor is between the primary-side winding and the secondary-side winding.

7. The DC/DC converter according to claim 6, further comprising a full-wave rectifier circuit, wherein:
   the primary-side winding, the resonant inductor, and the resonant capacitor are connected between a first node and a second node after being connected in series;
   the secondary-side winding is connected between a third node and a fourth node;
   the secondary-side winding comprises a first secondary-side winding and a second secondary-side winding;
   the first secondary-side winding is connected between the third node and a fifth node, and the second secondary-side winding is connected between the fifth node and the fourth node; and
   the third node and the fourth node are connected to the full-wave rectifier circuit, and an output terminal of the full-wave rectifier circuit is the output terminal of the DC/DC converter.

8. The DC/DC converter according to claim 7, further comprising a full-bridge rectifier circuit, wherein:
   there is one secondary-side winding;
   the third node and the fourth node are respectively a positive electrode and a negative electrode of an input terminal of the full-bridge rectifier circuit; and an output terminal of the full-bridge rectifier circuit is the output terminal of the DC/DC converter.

9. The DC/DC converter according to claim 2, wherein the signal source comprises a first capacitive coupling circuit, wherein:
the first capacitive coupling circuit is configured to couple energy from the resonant inductor, and the first capacitive coupling circuit is connected between the primary-side quiescent point and the secondary-side quiescent point after being connected in series to the impedance network.

10. The DC/DC converter according to claim 2, wherein:
a sum of a total noise current generated on the first parasitic capacitance and the second parasitic capacitance by the resonant inductor and the resonant capacitor and a current of a cancellation impeder is zero; and
the parasitic capacitor is between the primary-side winding and the secondary-side winding.

11. The DC/DC converter according to claim 1, wherein:
the signal source couples energy from the resonant capacitor; and
a voltage amplitude of the signal source is directly proportional to a voltage amplitude of the resonant capacitor.

12. The DC/DC converter according to claim 11, wherein the signal source comprises a second capacitive coupling circuit, wherein:
the second capacitive coupling circuit is configured to couple energy from the resonant capacitor, and the second capacitive coupling circuit is connected between the primary-side quiescent point and the secondary-side quiescent point after being connected in series to the impedance network.

13. The DC/DC converter according to claim 11, wherein the signal source comprises a signal coupling transformer, wherein:
a primary-side winding of the signal coupling transformer is configured to couple energy from the resonant capacitor, a secondary-side winding of the signal coupling transformer is connected between the primary-side quiescent point and the secondary-side quiescent point after being connected in series to the impedance network.

14. The DC/DC converter according to claim 1, wherein the DC/DC converter comprises at least one of a full-bridge LLC resonant DC/DC converter or a half-bridge LLC resonant DC/DC converter.

15. The DC/DC converter of claim 1, wherein the impedance network comprises at least one of the following: a resistor, a capacitor, or an inductor.

16. A communication power supply, comprising a DC/DC converter and a rectifier circuit,
the DC/DC converter comprising: a primary-side winding, a secondary-side winding, a resonant inductor, a resonant capacitor, and a noise suppression network, wherein:
the primary-side winding and the secondary-side winding form a transformer;
the noise suppression network is connected between a primary-side quiescent point and a secondary-side quiescent point of the transformer, the primary-side quiescent point is a direct current stable potential at an input terminal of the DC/DC converter, and the secondary-side quiescent point is a direct current stable potential at an output terminal of the DC/DC converter;
a first parasitic capacitance between a first terminal of the primary-side winding and the secondary-side quiescent point is equal to a second parasitic capacitance between a second terminal of the primary-side winding and the secondary-side quiescent point; and the noise suppression network is configured to generate a suppression current, a direction of the suppression current is opposite to a direction of a total noise current generated by the resonant inductor and the resonant capacitor;
the noise suppression network comprises a signal source and an impedance network; and
the signal source and the impedance network are connected between the primary-side quiescent point and the secondary-side quiescent point after being connected in series, a first terminal of the rectifier circuit is configured to connect to an alternating current power supply;
the rectifier circuit is configured to convert an alternating current of the alternating current power supply into a direct current;
a second terminal of the rectifier circuit is configured to connect to a first terminal of the DC/DC converter;
a second terminal of the DC/DC converter is configured to supply power to a load; and
the DC/DC converter is configured to receive the direct current output by the rectifier circuit, and perform voltage conversion on the direct current.

17. The communication power supply according to claim 16, wherein:
the noise suppression network comprises a signal source and an impedance network; and
the signal source and the impedance network are connected between the primary-side quiescent point and the secondary-side quiescent point after being connected in series.

18. The communication power supply according to claim 17, wherein:
the signal source couples energy from the resonant inductor; and
a voltage amplitude of the signal source is directly proportional to a voltage amplitude of the resonant inductor.

19. The communication power supply according to claim 18, wherein the signal source comprises a cancellation inductor, wherein:
the cancellation inductor is configured to couple energy from the resonant inductor, and the cancellation inductor is connected between the primary-side quiescent point and the secondary-side quiescent point after being connected in series to the impedance network.

* * * * *